United States Patent [19]

Lang et al.

[11] Patent Number: 5,547,213
[45] Date of Patent: Aug. 20, 1996

[54] PRESS-ON INFLATOR MOUNT

[75] Inventors: Gregory J. Lang, South Ogden; George C. Marjanski, Riverdale, both of Utah

[73] Assignee: Morton International, Inc., Chicago, Ill.

[21] Appl. No.: 566,886

[22] Filed: Dec. 4, 1995

Related U.S. Application Data

[63] Continuation-in-part of Ser. No. 522,978, Sep. 1, 1995.
[51] Int. Cl.$^6$ ..................................................... B60R 21/16
[52] U.S. Cl. ........................................ 280/728.2; 280/731
[58] Field of Search ............................... 280/728.1, 731, 280/732, 741

[56] References Cited

U.S. PATENT DOCUMENTS

| | | | |
|---|---|---|---|
| 5,141,247 | 8/1992 | Barth | 280/728.2 |
| 5,275,431 | 1/1994 | Stephens | 280/728.2 |
| 5,320,379 | 6/1994 | Burnard et al. | 280/728.2 |
| 5,423,568 | 6/1995 | Zushi et al. | 280/728.2 |
| 5,433,472 | 7/1995 | Green et al. | 280/728.2 |
| 5,435,594 | 7/1995 | Gille | 280/728.2 |

*Primary Examiner*—Kenneth R. Rice
*Attorney, Agent, or Firm*—George W. Rauchfuss, Jr.; Gerald K. White

[57] ABSTRACT

An inflator mount for attachment to an inflator having a cylindrical sidewall and a peripheral inflator flange radially extending from the sidewall, and for mounting the inflator within an airbag module. The inflator mount includes a generally flat annular bracket having an inside edge defining an opening that accommodates passage of the radially extending peripheral inflator flange. An inflator flange grip extends downwardly and inwardly from the inside edge of the annular bracket. The inflator flange grip slidingly receives and grippingly engages the inflator flange and embraces the underside thereof to thereby secure the inflator mount to the inflator and adapt the inflator and inflator mount for mounting in an airbag module by means of the annular bracket. The inflator flange grip is variously provided as a cylindrical sleeve frictionally gripping the inflator flange, a cylindrical sleeve with resilient snap tabs, a cylindrical sleeve with inwardly extending dimples, and a cylindrical sleeve with discontinuous segments each having a continuous rib. A unitary module housing and inflator mount is also provided and includes a base plate that is unitary with an annular bracket having an inner edge defining an opening. A housing sidewall extends upwardly from an outer edge of the base plate and defines an open top of the module housing. The unitary module housing and inflator mount also includes an inflator flange grip extending downwardly and inwardly from the inner edge of the annular bracket.

25 Claims, 7 Drawing Sheets

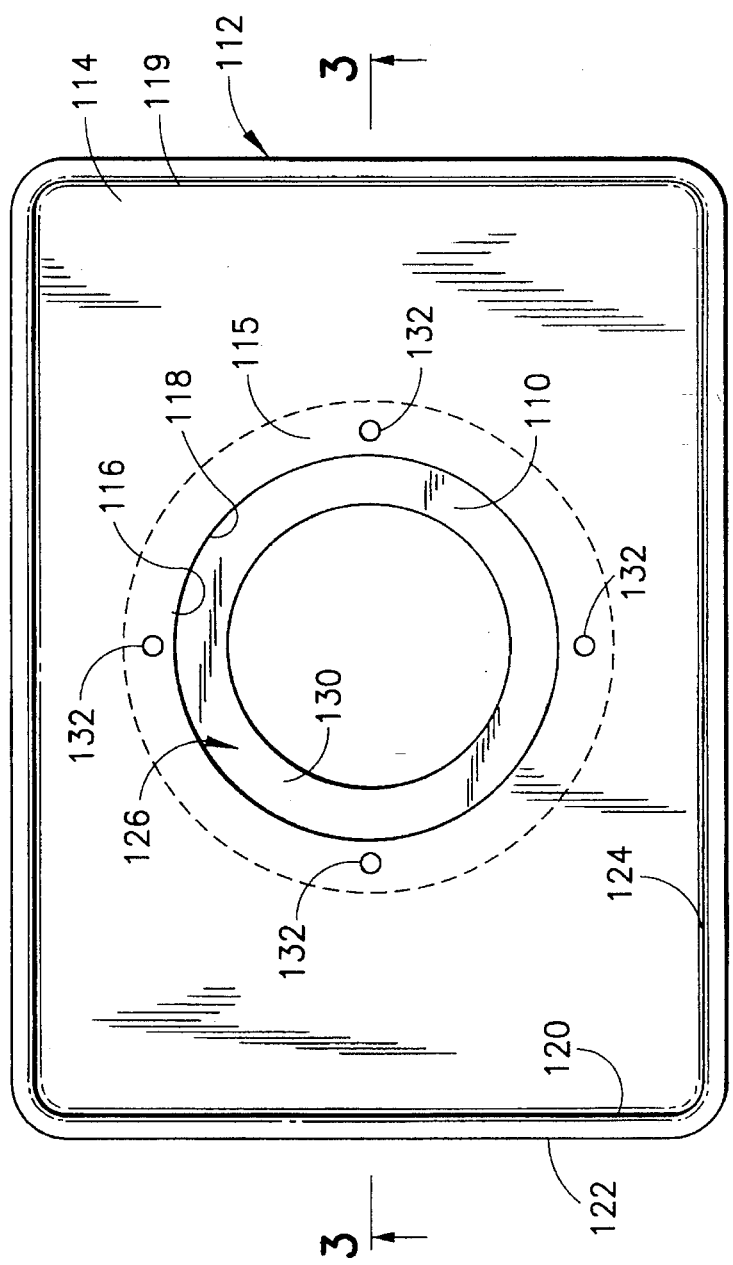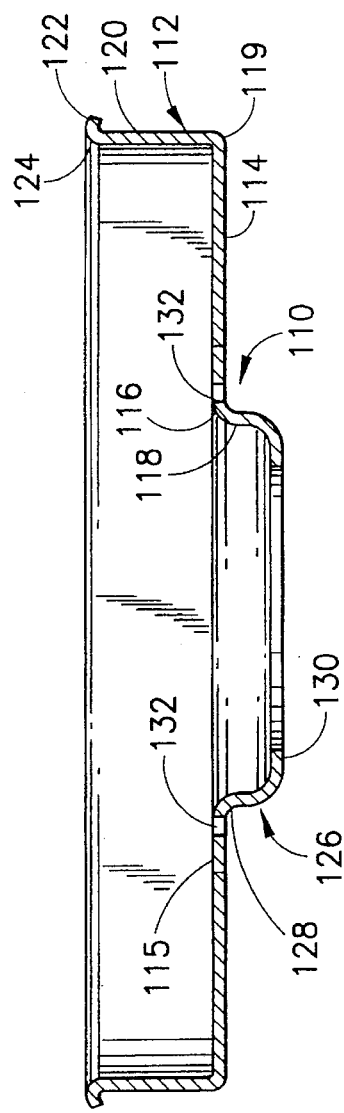
FIG. 2
FIG. 3

5,547,213

PRESS-ON INFLATOR MOUNT

RELATED APPLICATION

The present Application is a Continuation-In-Part of copending application Ser. No. 08/522,978, filed on Sep. 1, 1995, currently pending.

FIELD OF THE INVENTION

The present invention relates to an inflator mount for use with an airbag module. More particularly, the present invention relates to a press-on inflator mount that attaches to an inflator and is adapted to mount the inflator in a driver side airbag module.

BACKGROUND OF THE INVENTION

Providing a separate easily attachable inflator mount that can be pressed onto an inflator, mount the inflator within an airbag module, and prevent inflator rotation with respect to the inflator mount would be useful. Providing an inflator mount that is unitary with a module housing of an airbag module would also be desirable. Inflators are used in airbag modules that are in turn used in inflatable restraint systems. Inflatable restraint systems are employed in automobiles for protecting an occupant against injury by physically restraining the occupant's body when the automobile encounters a collision.

The airbag module normally includes an inflator, a module housing and an airbag cushion. The module housing includes a base plate that supports the inflator and airbag cushion, and a housing sidewall that surrounds the folded airbag cushion. The inflator includes an inflator housing containing a gas generant material that, once triggered by a remote collision sensor, provides the inflation gas for inflating the airbag cushion. The inflator housing has a cylindrical sidewall forming a plurality of gas exhaust ports, and an integral peripheral bracket that extends radially outwardly from the sidewall below the gas exhaust ports. The base plate of the module housing has an inflator-receiving hole with a portion of the inflator extending therethrough. The airbag cushion has an open mouth formed by a collar that fits over the inflator with the collar positioned against the base plate so that the gas exhaust ports are located within the open mouth. The collar of the airbag cushion and the peripheral bracket of the inflator are secured to the base plate of the module housing, holding the airbag module together, and preventing the airbag cushion and inflator from becoming separated during inflation of the airbag cushion.

Providing an inflator mount in place of the peripheral bracket that is separate from, yet easily attachable to the inflator would save manufacturing time and reduce costs. Because the peripheral bracket is integral with the inflator housing on most existing inflators, the inflator housing is much more difficult and costly to fabricate. Using a stamping technique to manufacture the inflator, which is preferably from a cost standpoint, does not readily allow incorporating the peripheral bracket as an integral part of the inflator. Accordingly, providing an inflator housing that does not have an integral peripheral mounting bracket but has a separate, attachable, inflator mount that can be easily attached to the inflator prior to installing the inflator within the airbag module would be useful.

A separate inflator mount should attach to and mount an inflator so that the inflator will not become unattached from the airbag module during inflation of the airbag cushion. Forces which tend to pull the airbag module apart are produced during inflation of the airbag cushion, and the inflator mount should secure the inflator to withstand these forces. As with all components used in automobiles, the inflator mount should also mount the inflator in a squeak and rattle-free manner. If the inflator mount could be unitary with the module housing it would reduce the number of separate parts comprising the airbag module and simplify assembly of the airbag module.

One prior art inflator, shown and described in U.S. Pat. No. 5,275,431, provides an inflator and a separate retainer member or inflator mount that is secured to the inflator using a radial crimping or forming method. The '431 inflator has an inflator flange and the inflator mount has an annular wall surface or cylindrical sleeve encircling the inflator and the inflator flange. A first flange or annular bracket, that attaches to the airbag module, extends outwardly from the sleeve and a second flange or support ring extends inwardly over the inflator flange. Once slid onto the inflator flange and the inflator, a crimped portion or flange clamp is formed in the sleeve using a radial crimping or forming method. The flange clamp clamps the inflator flange against the support ring securing the inflator mount to the inflator. The inflator mount on this inflator, therefore, requires an additional assembly step, crimping the sleeve, after being placed on the inflator.

It would be helpful, therefore, to provide an inflator mount that can be easily pressed onto an inflator and secured thereto without having to crimp the inflator mount or perform any other assembly steps thereafter. The inflator mount should lock onto the inflator, mount the inflator within an airbag module, and prevent inflator rotation with respect to the inflator mount. The inflator mount should also secure the inflator to the airbag module to withstand the expansive forces during inflation of the airbag, and provide shake and rattle-free mounting. It would also be useful to provide a unitary module housing and inflator mount.

SUMMARY OF THE INVENTION

An object, therefore, of the present invention is to provide a separate inflator mount that is easily attached and secured to an inflator without requiring a further assembly step.

Another object of the present invention is to provide a separate inflator mount that secures an inflator to an airbag module and prevents rotation of the inflator with respect to the mount.

An additional object of the present invention is to provide a separate inflator mount that easily attaches to an inflator and secures the inflator within an airbag module to withstand the excessive forces created during inflation of the airbag cushion.

A further object of the present invention is to provide a separate inflator mount that provides shake and rattle-free mounting of an inflator.

Yet another object of the present invention is to provide an inflator mount that is unitary with a module housing of an airbag module.

In carrying out this invention, there is provided an inflator mount for attachment to an inflator having a cylindrical sidewall and a peripheral inflator flange radially extending from the sidewall, and for mounting the inflator within an airbag module. The inflator mount includes a generally flat annular bracket having an inside edge defining an opening that accommodates passage of the radially extending peripheral inflator flange. An inflator flange grip extends downwardly and inwardly from the inside edge of the annular bracket. The inflator flange grip slidingly receives and grippingly engages the inflator flange and embraces the underside thereof to secure the inflator mount to the inflator and adapt the inflator and inflator mount for mounting in an airbag module by means of the annular bracket.

According to one aspect of the present invention, the inflator flange grip comprises a cylindrical sleeve and a lower support ring. The sleeve extends downwardly from the annular bracket and frictionally and grippingly engages the outer periphery of the inflator flange, and the lower support ring extends inwardly from the cylindrical sleeve and embraces at least a portion of the underside of the flange.

According to another aspect of the present invention, the inflator flange grip further includes a flange clamp adapted to extend over at least a portion of the inflator flange and clamp the inflator flange against the support ring. According to an additional aspect of the present invention, the flange clamp comprises a plurality of spaced-apart, resilient, snap tabs extending inwardly from the sleeve. The tabs are adapted to resiliently bend outward to slide over the flange, and once over the flange, resiliently bend inward to clamp the flange against the support ring. According to a further aspect of the present invention, the flange clamp comprises a plurality of spaced-apart dimples extending inwardly from the sleeve and which are received over the inflator flange. According to still another aspect of the present invention, the cylindrical sleeve and support ring comprise at least two discontinuous segments. Each sleeve segment has a continuous radial rib extending inwardly to comprise the flange clamp.

According to still yet another aspect of the present invention, a unitary module housing and inflator mount is provided and includes a housing base plate having a unitary annular bracket with an inner edge defining an opening accommodating passage of the inflator flange. A housing sidewall extends upwardly from an outer edge of the housing base plate and defines an open top of the module housing. The unitary module housing and inflator further includes an inflator flange grip extending downwardly from the inner edge of the annular bracket. The inflator flange grip slidingly receives and grippingly engages the inflator flange and embraces the underside thereof to secure the unitary module housing and inflator mount to the inflator for mounting in an airbag module.

The present invention, therefore, provides an inflator mount that can be easily pressed onto an inflator and secured thereto without having to crimp the inflator mount or perform any further assembly steps. The present invention also provides the inflator mount for mounting in or unitary with a module housing.

The invention together with further objects, features, advantages and aspects thereof, will be more clearly understood from the following description taken in connection with the accompanying drawings.

BRIEF DESCRIPTION OF THE DRAWINGS

FIG. 2 is a top elevation view of a unitary module housing and inflator mount according to the present invention;

FIG. 3 is a sectional view of the unitary module housing and inflator mount taken along the line 3—3 of FIG. 2;

The same reference numerals refer to the same elements throughout the various figures.

DETAILED DESCRIPTION OF THE INVENTION

Figure 1:
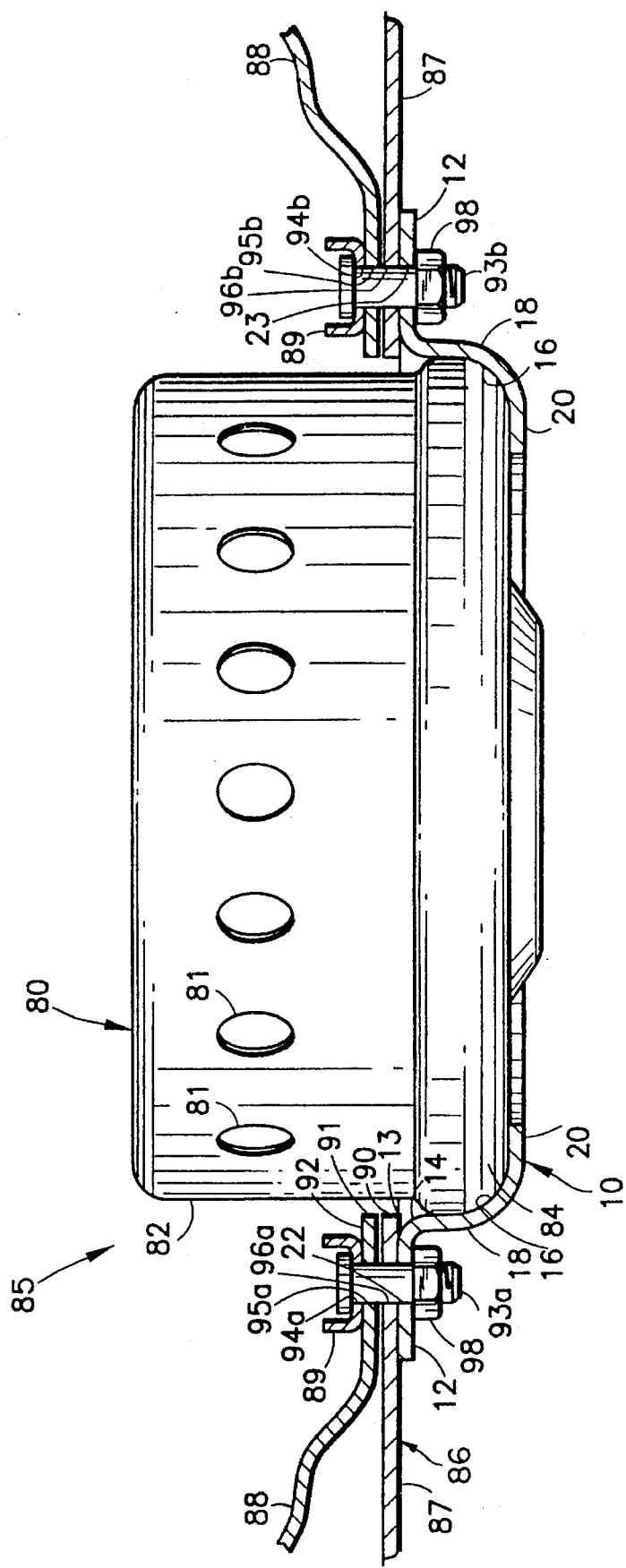
FIG. 1 is a side elevation view, partially in section, of a inflator mount according to the present invention attached to an inflator and mounted within an airbag module.

Referring first to FIG. 1, the present invention is directed to an inflator mount 10 for attachment to an inflator 80 having a cylindrical sidewall 82 and a peripheral inflator flange 84 radially extending from the sidewall 82. The inflator mount is adapted to mount the inflator 80 within an airbag module 85.

The inflator mount 10 includes a continuous, generally flat, annular bracket 12 having an inside edge 13 defining an opening 14 accommodating passage of the radially extending peripheral inflator flange 84. An inflator flange grip 16 extends downwardly and inwardly from the inside edge 13 of the annular bracket 12. The flange grip 16 slidingly receives and grippingly engages the inflator flange 84 and embraces the underside thereof to secure the inflator mount 10 to the inflator 80 and adapt the inflator and inflator mount 10 for mounting in an airbag module 85 by means of the annular bracket 12.

The flange grip 16 comprises a continuous cylindrical sleeve 18 and a continuous lower support ring 20, although both could be provided in discontinuous segments. The sleeve 18 extends downwardly from the annular bracket 12 and frictionally and grippingly engages the outer periphery of the inflator flange 84. The lower support ring 20 extends inwardly from the cylindrical sleeve 18 and conforms to and embraces at least a portion of the underside of the flange 84.

The inflator mount 10 is made of spring steel or another suitable material and is a one-piece stamped member. During assembly, the inflator mount 10 is pressed onto the inflator 80. The cylindrical sleeve 18 of the inflator mount 10 is of slightly smaller diameter than the inflator flange 84 and as the sleeve 18 slides over the flange 84 it resiliently deforms outwardly to accept the flange 84. The resilient deformation causes the sleeve 18 to radially clamp and frictionally engage the flange 84 to secure the inflator mount 10 to the inflator 80 and prevent inflator rotation with respect to the inflator mount 10. Once attached to the inflator 80, the inflator mount 10 is ready to be secured in an airbag module 85.

FIG. 1 also shows the inflator mount 10 and inflator 80 secured in a driver side airbag module 85. The airbag module 85 includes an airbag cushion 88, an airbag retainer 89 and a module housing 86 having a base plate 87. The cylindrical sidewall 82 of the inflator 80 includes a plurality of gas exhaust ports 81 and contains a gas generant material that, once triggered by a remote collision sensor (not shown), provides the inflation gas for inflating the airbag cushion 88. The annular bracket 12 of the inflator mount 10 is positioned against the base plate 87 so that a portion of the sidewall 82 containing the gas exhaust ports 81 extends through an inflator receiving hole 90 in the base plate 87. The airbag cushion 88 has an open mouth 91 formed by a collar 92 that fits over the inflator 80 with the collar 92 positioned against the base plate 87 so that the gas exhaust ports 81 are located within the open mouth 91. The airbag retainer 89 is positioned over the collar 92 of the airbag cushion 88 and the retainer 89, collar 92 and annular bracket 12 are secured to the base plate 87 with fasteners 93a,93b. The fasteners 93a,93b pass through, respectively, receiving holes 94a,94b in the retainer 89, receiving holes 95a,95b in the collar 92, receiving holes 96a,96b in the base plate 87 and receiving holes 22,23 in the annular bracket 12, and are secured with nuts 98,99 or the like. During inflation of the airbag cushion 88, inflation forces tend to push the inflator 80 downward and the support ring 20 holds the inflator 80 within the airbag module 85.

Referring to FIGS. 2 and 3, an inflator mount 110 similar to the inflator mount 10 of FIG. 1 is shown unitary with a module housing 112 according to the present invention. The module housing 112 has a base plate 114 which includes as a unitary construction an annular bracket 115 of the inflator mount 110. The dotted line is provided to indicate a transition between the base plate 114 and the annular bracket 115 of module housing 112, although it will be appreciated they are a unitary one-piece structure. An inner edge 116 of annular bracket 115 defines an opening 118 accommodating passage of the inflator flange, and a housing sidewall 120 extends upwardly from an outer edge 119 of the base plate 114. The housing sidewall 120 ends in a curled lip 122 defining an open top 124 of the module housing 112. The unitary module housing 112 and inflator mount 110 further includes an inflator flange grip 126 extending downwardly and inwardly from the inner edge 116 of the annular bracket 115. The inflator flange grip 126 comprises a continuous cylindrical sleeve 128 and a lower support ring 130.

As shown in FIG. 2, the base plate 114 and housing sidewall 120 are generally rectangular, but other shapes are suitable. The annular bracket 115 defines fastener receiving holes 132 for mounting an airbag cushion (not shown but similar to the airbag cushion 88 of FIG. 1). The housing sidewall 120 is adapted to surround the airbag cushion, which is folded within the module housing 112 prior to inflation. The curled lip 122 of the housing sidewall 120 is normally adapted to catch the edges of an airbag module cover (not shown) to close the open top of the module housing 112.

Figure 4:
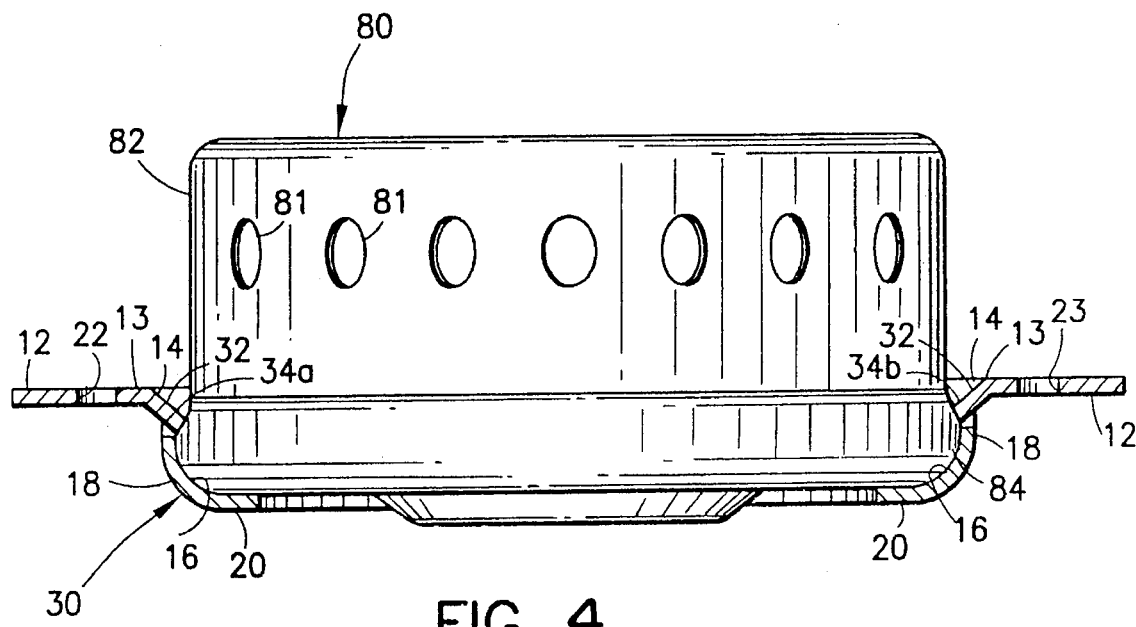
FIG. 4 is a side elevation view, partially in section, of another inflator mount according to the present invention attached to an inflator.
Figure 5:
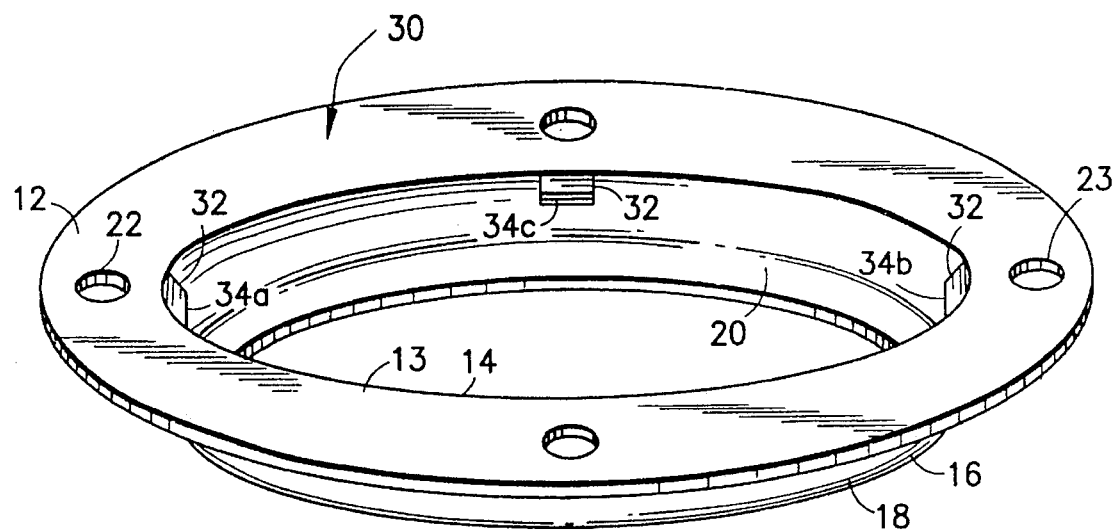
FIG. 5 is a perspective view of the inflator mount of FIG. 4.
Figure 6:
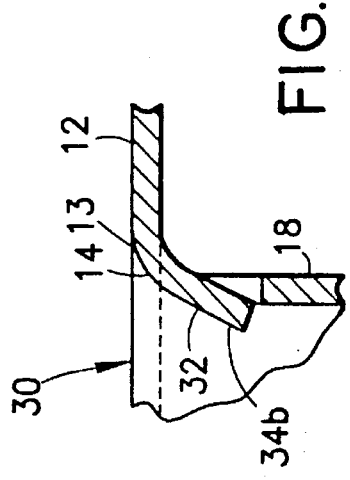
FIG. 6 is an enlarged sectional view of a portion of the inflator mount of FIGS. 4 and 5.

Referring to FIGS. 4 through 6, another inflator mount 30 according to the present invention is shown. The inflator mount 30 has an annular bracket 12, having an inner edge 13, opening 14 and fastener receiving holes 22,23,24,25, and an inflator flange grip 16 comprising a cylindrical sleeve 18 and a support ring 20. In addition, the inflator mount 30 includes a flange clamp 32 adapted to extend over at least a portion of the inflator flange 84 and clamp the inflator flange 84 against the support ring 20. The flange clamp 32 comprises four spaced-apart, resilient, snap tabs 34a,34b,34c (the fourth snap tab is not shown, but is similar to and positioned opposite snap tab 34c) that extend inwardly from the cylindrical sleeve 18 and are resiliently deformable. The tabs 34a,34b,34c resiliently bend to slide over the inflator flange 84 as the flange 84 is inserted through opening 14 and, once over the flange 84, resilient bend back to extend inwardly over the flange 84 to clamp the flange 84 against the support ring 20.

Figure 7:
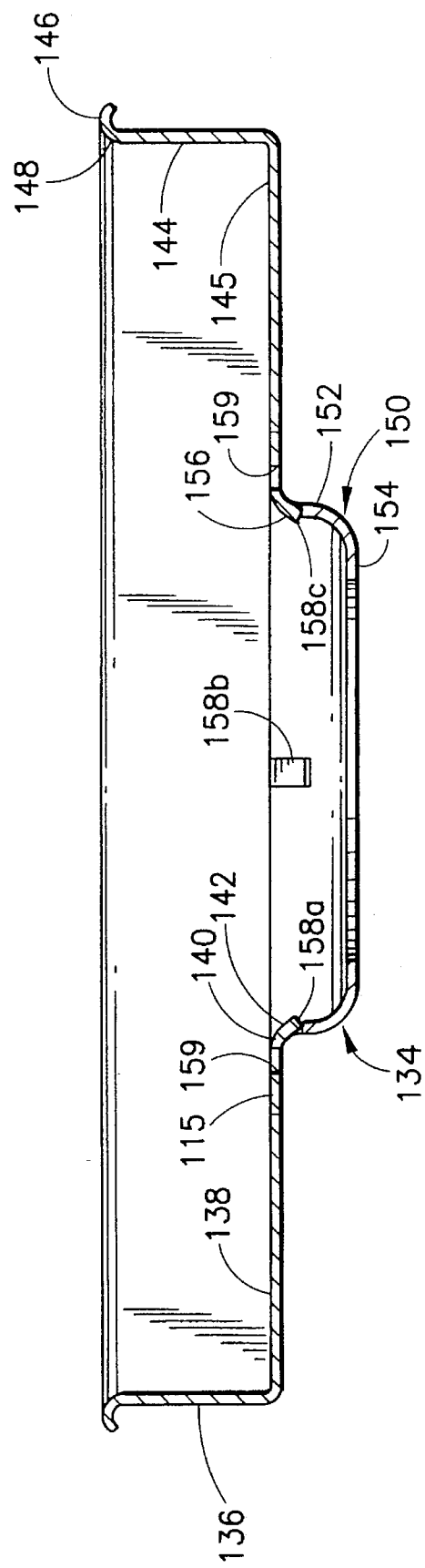
FIG. 7 is a side elevation view, in section, of another unitary module housing and inflator mount according to the present invention.

Referring to FIG. 7, an inflator mount 134 similar to the inflator mount 30 of FIGS. 4–6 is shown unitary with a module housing 136 according to the present invention. The unitary module housing 136 and inflator mount 134 includes a base plate 138 having a unitary annular bracket 139 with an inner edge 140 defining an opening 142 accommodating passage of an inflator flange. A housing sidewall 144 extends upwardly from an outer edge 145 of the base plate 138 and ends in a curled lip 146 defining an open top 148 of the module housing 136. The unitary module housing 136 and inflator mount 134 further includes an inflator flange grip 150 extending downwardly and inwardly from the inner edge 140 of the annular bracket 139. The inflator flange grip 150 comprises a continuous cylindrical sleeve 152 and a lower support ring 154. In addition, the inflator mount 134 includes a flange clamp 156 comprising four spaced-apart, resilient, snap tabs 158a,158b,158c that extend inwardly from the cylindrical sleeve 152 and are resiliently deformable (the fourth snap tab is not shown but is similar to and opposite from snap tab 158b). Fastener receiving holes 159 for mounting an airbag cushion are provided in the annular bracket 139.

Figure 8:
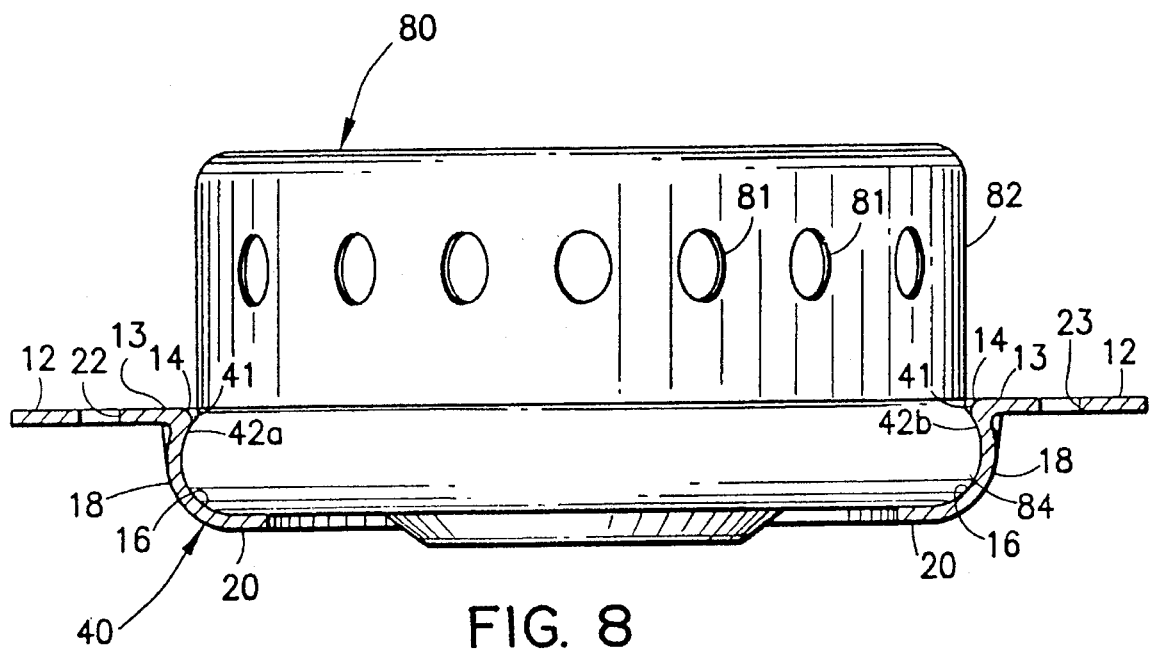
FIG. 8 is a side elevation view, partially in section, of an additional inflator mount according to the present invention attached to an inflator.
Figure 9:
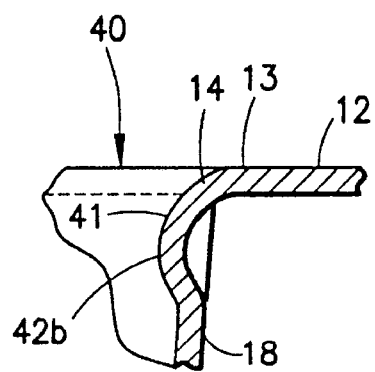
FIG. 9 is an enlarged sectional view of a portion of the inflator mount of FIG. 8.

Referring to FIGS. 8 and 9, an additional inflator mount 40 according to the present invention is shown. The inflator mount 40 has an annular bracket 12 and an inflator flange grip 16 comprising a cylindrical sleeve 18 and a support ring 20. In addition, the inflator mount 40 includes a flange clamp 41 that comprises four spaced-apart dimples 42a,42b (the two other dimples are not shown but are similar to dimples 42a,42b,) extending inwardly from the cylindrical sleeve 18. The sleeve 18 elastically deforms to allow the inflator mount 40 to be pressed onto the inflator 80, with the dimples 42a,42b sliding over the inflator flange 84. Once past the flange 84, the dimples 42a,42b extend over the flange 84 to clamp the flange 84 against the support ring 20 and further secure the inflator mount 40 to the inflator 80.

Figure 10:
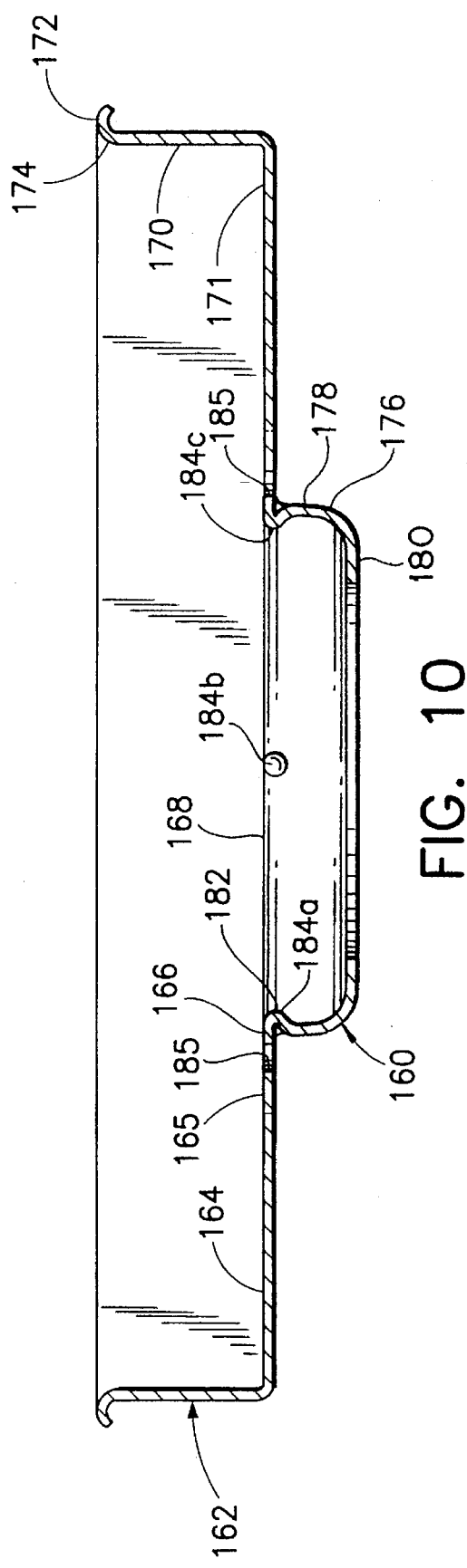
FIG. 10 is a side elevation view, in section, of an additional unitary module housing and inflator mount according to the present invention.

Referring to FIG. 10, an inflator mount 160 similar to the inflator mount 40 of FIGS. 8 and 9 is shown unitary with a module housing 162 according to the present invention. The unitary module housing 162 and inflator mount 160 includes a base plate 164 having a unitary annular bracket 165 with an inner edge 166 defining an opening 168 accommodating passage of an inflator flange. A housing sidewall 170 extends upwardly from an outer edge 171 of the base plate 164 and ends in a curled lip 172 defining an open top 174 of the module housing 162. The unitary module housing 162 and inflator mount 160 haves an inflator flange grip 176 extending downwardly and inwardly from the inner edge 166 of the annular bracket 165. The inflator flange grip 176 comprises a continuous cylindrical sleeve 178 and a lower support ring 180. In addition, the inflator mount 160 includes a flange clamp 182 comprising four spaced-apart dimples 184a, 184b,184c that extend inwardly from the cylindrical sleeve 178 (the fourth dimple is not shown but is similar to and opposite from dimple 184b). Fastener receiving holes 185 for mounting an airbag cushion are provided in the annular bracket 165.

Figure 11:
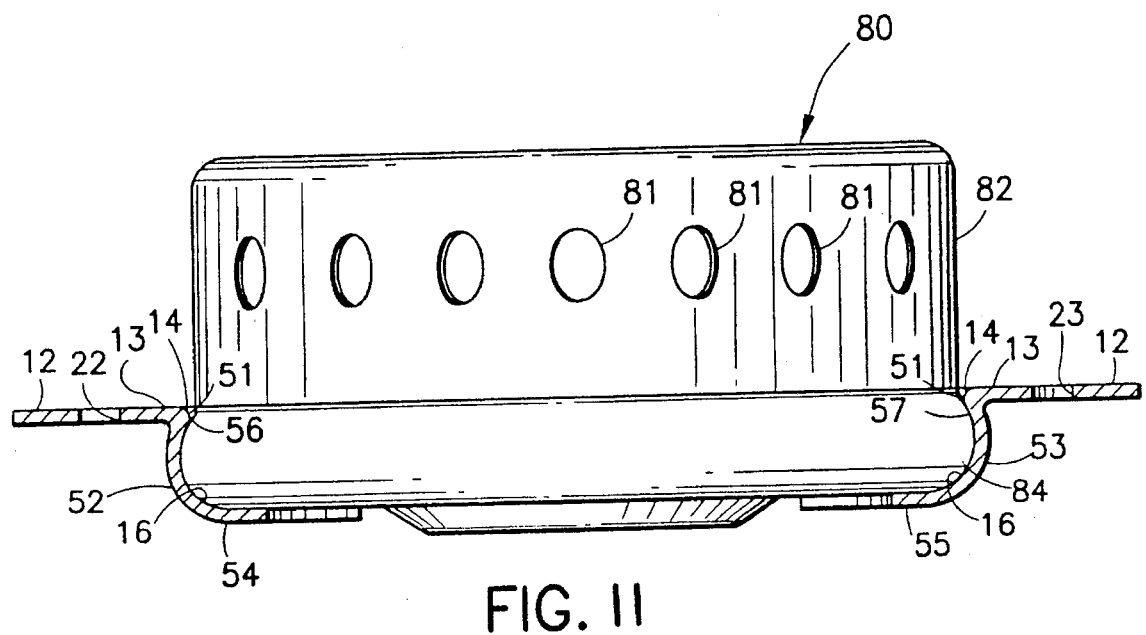
FIG. 11 is a side elevation view, partially in section, of a further inflator mount according to the present invention attached to an inflator.
Figure 12:
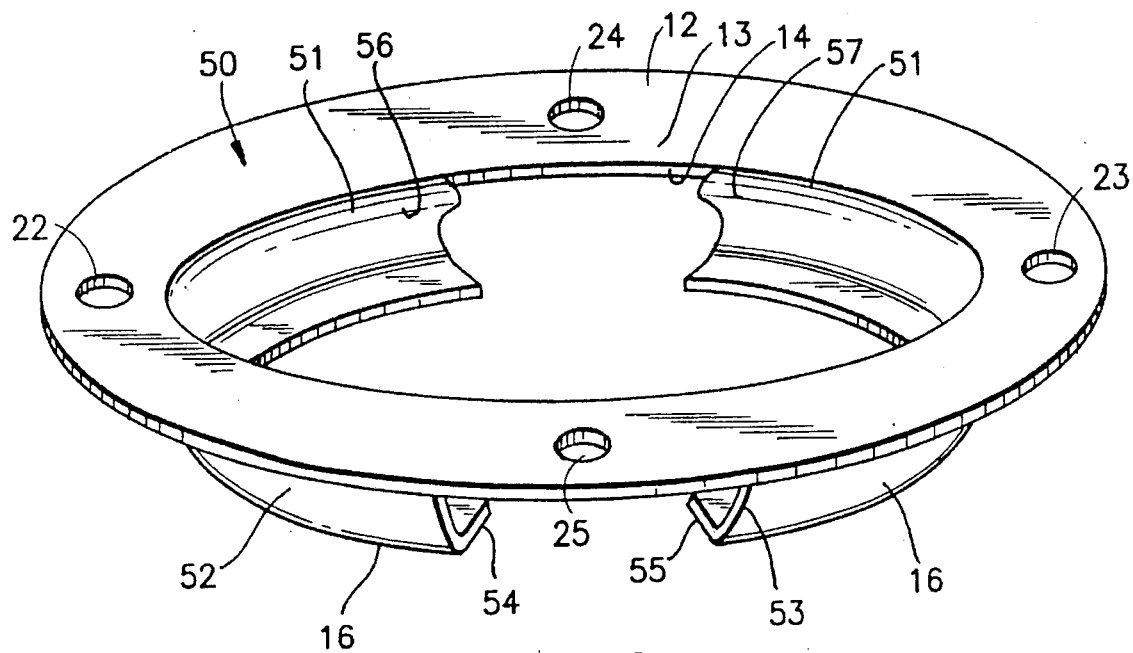
FIG. 12 is a perspective view of the inflator mount of FIG. 11.

Referring to FIGS. 11 and 12, a further inflator mount 50 according to the present invention is shown. The inflator mount 50 has an annular bracket 12 and an inflator flange grip 16 comprising a cylindrical sleeve 52,53 a support ring 54,55 and a flange clamp 51. The cylindrical sleeve 52,53 and support ring 54,55 each comprise two discontinuous segments and each sleeve segment 52,53 has a continuous radial rib 56,57, the ribs 56,57 comprise the flange clamp 51. As the inflator mount 50 is pressed onto the inflator 80, the discontinuous sleeve 52,53 and support ring 54,55 deform outwardly to allow the ribs 56,57 to slide over the inflator flange 84 to be seated over and adjacent the flange 84 and clamp the flange 84 against the support ring 54,55, further securing the inflator mount 50 to the inflator 80.

Figure 13:
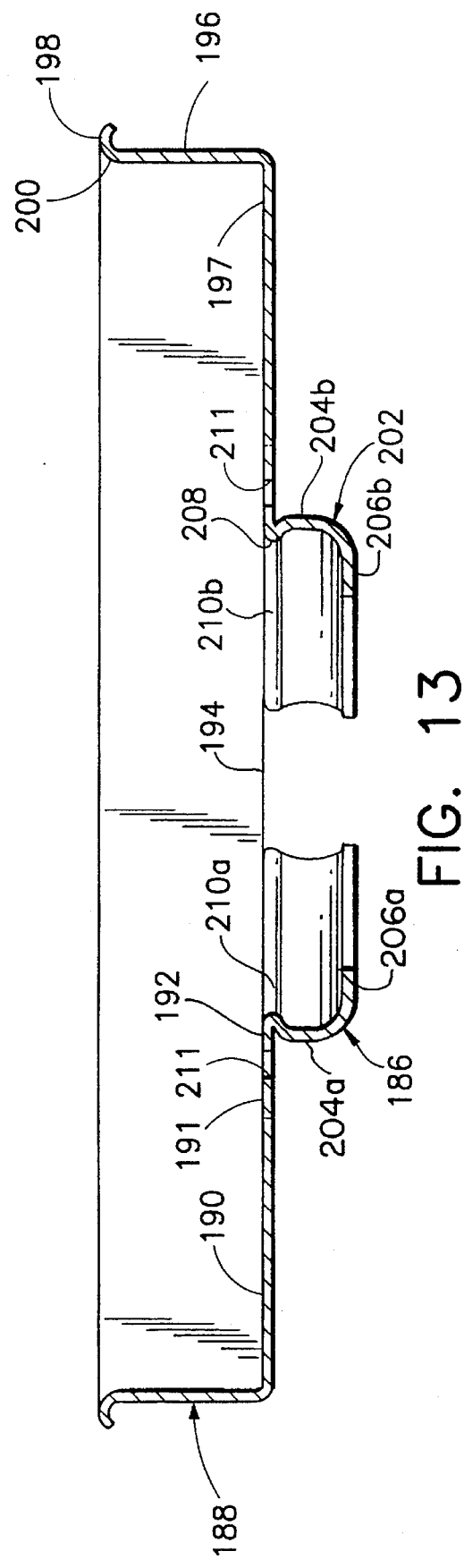
FIG. 13 is a side elevation view, in section, of a further unitary module housing and inflator mount according to the present invention.

Referring to FIG. 13, an inflator mount 186 similar to the inflator mount 50 of FIGS. 8 and 9 is shown unitary with a module housing 188 according to the present invention. The unitary module housing 188 and inflator mount 186 include a base plate 190 having a unitary annular bracket 191 with an inner edge 192 defining an opening 194 accommodating passage of an inflator flange. A housing sidewall 196 extends upwardly from an outer edge 197 of the base plate 190 and ends in a curled lip 198 defining an open top 200 of the module housing 188. The unitary module housing 188 and inflator mount 186 has an inflator flange grip 202 extending downwardly and inwardly from the inner edge 192 of the annular bracket 191. The inflator flange grip 202 comprises two discontinuous segments of a cylindrical sleeve 204a, 204b and a lower support ring 206a,206b. In addition, the inflator mount 186 includes a flange clamp 208 comprising a radial rib 210a,210b on each segment of the sleeve 204a,204b. Fastener receiving holes 211 for mounting an airbag cushion are provided in the annular bracket 191.

The inflator mounts adapt an inflator for mounting within an airbag module in a manner similar to that shown in FIG. 1 with respect to inflator mount 10. The present invention, therefore, provides a simple, reliable and low cost method of attaching a separate inflator mount to a driver side airbag inflator that allows greater flexibility in the design of the inflator mount and inflator. The inflator mount secures to the inflator, mounts the inflator within an airbag module assembly, and prevents inflator rotation with respect to the inflator mount. The inflator mount also secures the inflator to the airbag module assembly to withstand the expansive forces during inflation of the airbag, and provides shake and rattle-free mounting.

The present invention also provides an inflator mount with a module housing that reduces the number of separate parts comprising the airbag module, and simplify assembly of the airbag module.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflator mount for attachment to an inflator having a cylindrical sidewall and a peripheral inflator flange radially extending from the sidewall and for mounting the inflator within an airbag module, the inflator mount comprising:

a generally flat annular bracket having an inside edge defining an opening accommodating passage of the radially extending peripheral inflator flange; and an inflator flange grip extending downwardly and inwardly from the inside edge of the annular bracket, the inflator flange grip slidingly receiving and grippingly engaging the inflator flange and embracing the underside thereof, thereby securing the inflator mount to the inflator and adapting the inflator and inflator mount for mounting in an airbag module by means of the annular bracket.

2. The inflator mount of claim 1 wherein the inflator flange grip comprises a cylindrical sleeve extending downwardly from the annular bracket and frictionally and grippingly engaging the outer periphery of the inflator flange, and a lower support ring extending inwardly from the cylindrical sleeve and embracing at least a portion of the underside of the flange.

3. The inflator mount of claim 2 wherein the lower support ring conforms to the inflator flange.

4. The inflator mount of claim 2 wherein the inflator flange grip further includes a flange clamp adapted to extend over at least a portion of the inflator flange and clamp the inflator flange against the support ring.

5. The inflator mount of claim 4 wherein the flange clamp comprises a plurality of spaced-apart, resilient, snap tabs extending inwardly from the sleeve, the snap tabs adapted to resiliently bend outward to slide over the inflator flange, and once over the flange, to resiliently bend back to extend inward over the flange to clamp the flange against the support ring.

6. The inflator mount of claim 4 wherein the flange clamp comprises a plurality of spaced apart dimples extending inwardly from the sleeve and positioned to be received above the inflator flange.

7. The inflator mount of claim 4 wherein the cylindrical sleeve and support ring comprise at least two discontinuous segments and each sleeve segment has a continuous radial rib comprising the flange clamp, the segments deforming outwardly to receive the inflator flange.

8. The inflator mount of claim 4 wherein the annular bracket is a unitary one-piece construction with an airbag module housing.

9. The inflator mount of claim 1 wherein the annular bracket is a unitary one-piece construction with an airbag module housing.

10. An inflator mount for attachment to an inflator having a cylindrical sidewall and a peripheral inflator flange radially extending from the sidewall and for mounting the inflator within an airbag module, the inflator mounting attachment comprising:

a continuous generally flat annular bracket having an inside edge defining an opening accommodating passage of the radially extending peripheral inflator flange;

a continuous cylindrical sleeve extending downwardly from the annular bracket and frictionally and gripringly engaging the outer periphery of the inflator flange; and a continuous lower support ring extending inwardly from the cylindrical sleeve and conforming to and embracing at least a portion of the underside of the flange, thereby securing the inflator mount to the inflator and adapting the inflator and inflator mount for mounting in an airbag module by means of the annular bracket.

11. The inflator mount of claim 10 further comprising a flange clamp adapted to extend over at least a portion of the inflator flange and clamp the inflator flange against the support ring.

12. The inflator mount of claim 1 wherein the flange clamp comprises four spaced-apart, resilient, snap tabs extending inwardly from the cylindrical sleeve, the snap tabs adapted to resiliently bend outward to slide over the inflator flange, and once over the flange, to resiliently bend back to extend inward over the flange to clamp the flange against the support ring.

13. The inflator mount of claim 1 wherein the flange clamp comprises four spaced-apart dimples extending inwardly from the cylindrical sleeve and positioned to be received above the inflator flange.

14. The inflator mount of claim 11 wherein the cylindrical sleeve and support ring comprise two discontinuous segments and each sleeve segment has a continuous radial rib comprising the flange clamp, the segments deforming outwardly to receive the inflator flange.

15. The inflator mount of claim 1 wherein the annular bracket is a unitary one-piece construction with an airbag module housing.

16. The inflator mount of claim 10 wherein the annular bracket is a unitary one-piece construction with an airbag module housing.

17. A module housing for mounting and housing an inflator having a cylindrical sidewall and a peripheral inflator flange radially extending from the sidewall as part of an airbag module, the unitary module housing and inflator mount comprising:

a base plate; and an inflator mount including a generally flat annular bracket secured to the base plate, the annular bracket having inner edge defining an opening accommodating passage of the radially extending peripheral inflator flange, the inflator mount further including an inflator flange grip extending downwardly and inwardly from the inner edge of the annular bracket, the inflator flange grip slidingly receiving and grippingly engaging the inflator flange and embracing the underside thereof, thereby securing the inflator mount to the inflator.

18. The module housing of claim 17 wherein the base plate defines an inflator-receiving opening accommodating passage of the inflator flange, and the annular bracket of the inflator mount is secured to the base plate so that the opening defined by the annular bracket is positioned with respect to the inflator-receiving opening of the base plate so that an inflator extending through the opening of the annular bracket can extend through the inflator-receiving opening of the base plate.

19. The module housing of claim 18 wherein the annular bracket of the inflator mount is unitary with the base plate.

20. The module housing of claim 19 wherein the inflator flange grip of the inflator mount comprises a cylindrical sleeve that extends downwardly from the inner edge of the annular bracket and frictionally and grippingly engages an outer periphery of the inflator flange, and a lower support ring extends inwardly from the cylindrical sleeve and embraces at least a portion of the underside of the flange.

21. The module housing of claim 20 wherein the lower support ring conforms to the inflator flange.

22. The module housing of claim 20 wherein the inflator flange grip further includes a flange clamp adapted to extend over at least a portion of the inflator flange and clamp the inflator flange against the support ring.

23. The module housing of claim 22 wherein the flange clamp comprises a plurality of spaced-apart, resilient, snap tabs extending inwardly from the sleeve, the snap tabs adapted to resiliently bend outward to slide over the inflator flange, and once over the flange, to resiliently bend back to extend inwardly over the flange to clamp the flange against the support ring.

24. The module housing of claim 22 wherein the flange clamp comprises a plurality of spaced-apart dimples extending inwardly from the sleeve and positioned to be received above the inflator flange.

25. The module housing of claim 22 wherein the cylindrical sleeve and support ring comprise at least two discontinuous segments and each sleeve segment has a continuous radial rib comprising the flange clamp, the segments deforming outwardly to receive the inflator flange.

\* \* \* \* \*

UNITED STATES PATENT AND TRADEMARK OFFICE
CERTIFICATE OF CORRECTION

PATENT NO. : 5,547,213
DATED : August 20, 1996
INVENTOR(S) : Lang et al.

It is certified that error appears in the above-indentified patent and that said Letters Patent is hereby corrected as shown below:

Col. 9, Ln. 1, correct "claim 1" to read -- claim 11 -- .
Col. 9, Ln. 8, correct "claim 1" to read -- claim 11 -- .
Col. 9, Ln. 17, correct "claim 1" to read -- claim 11 -- .

Signed and Sealed this

Fourth Day of November, 1997

Attest:

BRUCE LEHMAN

Attesting Officer   Commissioner of Patents and Trademarks